United States Patent
Koga (10) Patent No.: US 10,924,190 B2
(45) Date of Patent: Feb. 16, 2021

(54) OPTICAL RECEIVER AND OPTICAL RECEPTION METHOD

(71) Applicant: NEC Corporation, Tokyo (JP)

(72) Inventor: Tadashi Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/753,585

(22) PCT Filed: Nov. 7, 2018

(86) PCT No.: PCT/JP2018/041286
§ 371 (c)(1),
(2) Date: Apr. 3, 2020

(87) PCT Pub. No.: WO2019/093354
PCT Pub. Date: May 16, 2019

(65) Prior Publication Data
US 2020/0336215 A1    Oct. 22, 2020

(30) Foreign Application Priority Data
Nov. 10, 2017   (JP) .................................. 2017-217027

(51) Int. Cl.
*H04B 10/61* (2013.01)
*H04J 14/02* (2006.01)
(Continued)

(52) U.S. Cl.
CPC ......... *H04B 10/615* (2013.01); *H04B 10/079* (2013.01); *H04B 10/572* (2013.01);
(Continued)

(58) Field of Classification Search
None
See application file for complete search history.

(56) References Cited

U.S. PATENT DOCUMENTS

2002/0149819 A1  10/2002  Sato
2004/0114939 A1*  6/2004  Taylor .................. H04B 10/64
                                                                      398/152
(Continued)

FOREIGN PATENT DOCUMENTS

EP           2237454 A1    10/2010
JP      2002-314486 A      10/2002
(Continued)

OTHER PUBLICATIONS

International Search Report corresponding to PCT/JP2018/041286, dated Jan. 15, 2019 (4 pages).
(Continued)

*Primary Examiner* — Darren E Wolf
(74) *Attorney, Agent, or Firm* — Wilmer Cutler Pickering Hale and Dorr LLP (57) ABSTRACT

An optical receiver is provided with: an optical reception circuit which receives wavelength multiplexed light including signal light, converts the signal light into an electrical signal by coherent detection of the signal light using local oscillation light, and outputs the power of the local oscillation light, the bit error rate of the signal light and the electrical signal; and a controller which monitors the power of the local oscillation light and the bit error rate, calculates the signal-to-noise ratio of the signal light on the basis of the power of the local oscillation light and the bit error rate, and finds the number of wavelengths of the wavelength multiplexed light and the power per wavelength of the signal light on the basis of the signal-to-noise ratio and the power of the local oscillation light.

20 Claims, 10 Drawing Sheets (51) Int. Cl.
H04B 10/079 (2013.01)
H04B 10/60 (2013.01)
H04B 10/572 (2013.01)
H04B 10/64 (2013.01)
H04B 10/63 (2013.01)

(52) U.S. Cl.
CPC .............. H04J 14/02 (2013.01); *H04B 10/60* (2013.01); *H04B 10/61* (2013.01); *H04B 10/63* (2013.01); *H04B 10/64* (2013.01); *H04B 10/65* (2020.05)

(56) References Cited

U.S. PATENT DOCUMENTS

| | | | |
|---|---|---|---|
| 2008/0152361 A1* | 6/2008 | Chen | H04B 10/6164 398/205 |
| 2010/0254718 A1 | 10/2010 | Oda et al. | |
| 2012/0057863 A1* | 3/2012 | Winzer | H04L 27/3863 398/3 |
| 2012/0213532 A1* | 8/2012 | Hironishi | H04B 10/6165 398/208 |
| 2012/0288286 A1* | 11/2012 | Houtsma | H04B 10/613 398/202 |
| 2013/0071109 A1* | 3/2013 | Khatana | H04B 10/615 398/38 |

FOREIGN PATENT DOCUMENTS

| | | |
|---|---|---|
| JP | 2010-245772 A | 10/2010 |
| JP | 2014-143518 A | 8/2014 |
| JP | 2014-165895 A | 9/2014 |
| JP | 2015-170916 A | 9/2015 |

OTHER PUBLICATIONS

Written Opinion corresponding to PCT/JP2018/041286, dated Jan. 15, 2019 (5 pages).

* cited by examiner

| Psig/ch | Nch | 1 | | | | 2 | | | | 16 | | | | 48 | | | | 96 | | | |
|---|---|---|---|---|---|---|---|---|---|---|---|---|---|---|---|---|---|---|---|---|---|
| | P_LO | 7 | 9 | 13 | 15 | 7 | 9 | 13 | 15 | 7 | 9 | 13 | 15 | 7 | 9 | 13 | 15 | 7 | 9 | 13 | 15 |
| 2 | | 16.886 | 16.919 | 16.952 | 16.927 | 16.717 | 16.811 | 16.909 | 16.843 | 14.862 | 15.528 | 16.340 | 15.804 | 12.323 | 13.529 | 15.266 | 14.063 | 10.111 | 11.617 | 14.032 | 12.348 |
| 1 | | 16.899 | 16.926 | 16.953 | 16.931 | 16.764 | 16.839 | 16.918 | 16.863 | 15.209 | 15.779 | 16.457 | 16.014 | 12.935 | 14.033 | 15.556 | 14.533 | 10.863 | 12.282 | 14.481 | 12.969 |
| 0 | | 16.908 | 16.930 | 16.951 | 16.932 | 16.799 | 16.860 | 16.923 | 16.878 | 15.504 | 15.988 | 16.550 | 16.186 | 13.491 | 14.478 | 15.800 | 14.926 | 11.570 | 12.893 | 14.874 | 13.534 |
| -1 | | 16.913 | 16.931 | 16.948 | 16.929 | 16.825 | 16.875 | 16.926 | 16.886 | 15.752 | 16.160 | 16.623 | 16.325 | 13.988 | 14.866 | 16.002 | 15.263 | 12.226 | 13.447 | 15.211 | 14.040 |
| -2 | | 16.914 | 16.929 | 16.943 | 16.924 | 16.844 | 16.884 | 16.925 | 16.890 | 15.957 | 16.299 | 16.680 | 16.436 | 14.427 | 15.199 | 16.167 | 15.549 | 12.828 | 13.942 | 15.497 | 14.487 |
| -3 | | 16.912 | 16.924 | 16.935 | 16.915 | 16.855 | 16.888 | 16.920 | 16.888 | 16.124 | 16.409 | 16.722 | 16.522 | 14.808 | 15.460 | 16.300 | 15.787 | 13.372 | 14.378 | 15.735 | 14.874 |
| -4 | | 16.905 | 16.915 | 16.924 | 16.902 | 16.859 | 16.886 | 16.912 | 16.881 | 16.258 | 16.495 | 16.751 | 16.586 | 15.134 | 15.714 | 16.404 | 15.980 | 13.856 | 14.757 | 15.931 | 15.205 |
| -5 | | 16.895 | 16.903 | 16.910 | 16.885 | 16.857 | 16.879 | 16.900 | 16.868 | 16.362 | 16.559 | 16.769 | 16.631 | 15.407 | 15.905 | 16.484 | 16.135 | 14.280 | 15.079 | 16.088 | 15.482 |
| -6 | | 16.879 | 16.887 | 16.892 | 16.862 | 16.849 | 16.867 | 16.884 | 16.849 | 16.441 | 16.605 | 16.777 | 16.659 | 15.632 | 16.058 | 16.542 | 16.253 | 14.645 | 15.348 | 16.212 | 15.709 |
| -7 | | 16.858 | 16.865 | 16.868 | 16.833 | 16.833 | 16.849 | 16.862 | 16.822 | 16.496 | 16.633 | 16.774 | 16.670 | 15.812 | 16.175 | 16.580 | 16.340 | 14.953 | 15.568 | 16.304 | 15.888 |
| -8 | | 16.831 | 16.837 | 16.839 | 16.796 | 16.810 | 16.824 | 16.834 | 16.787 | 16.530 | 16.645 | 16.761 | 16.665 | 15.952 | 16.261 | 16.600 | 16.398 | 15.207 | 15.743 | 16.369 | 16.025 |
| -9 | | 16.795 | 16.802 | 16.802 | 16.750 | 16.778 | 16.791 | 16.798 | 16.743 | 16.545 | 16.642 | 16.737 | 16.644 | 16.055 | 16.319 | 16.603 | 16.427 | 15.409 | 15.876 | 16.409 | 16.121 |
| -10 | | 16.751 | 16.757 | 16.756 | 16.691 | 16.736 | 16.748 | 16.752 | 16.686 | 16.540 | 16.623 | 16.702 | 16.606 | 16.123 | 16.350 | 16.589 | 16.431 | 15.564 | 15.971 | 16.425 | 16.180 |
| -11 | | 16.694 | 16.700 | 16.698 | 16.619 | 16.682 | 16.693 | 16.695 | 16.614 | 16.517 | 16.587 | 16.652 | 16.550 | 16.160 | 16.355 | 16.557 | 16.408 | 15.675 | 16.029 | 16.418 | 16.203 |
| -12 | | 16.624 | 16.630 | 16.626 | 16.528 | 16.613 | 16.624 | 16.623 | 16.525 | 16.472 | 16.534 | 16.587 | 16.473 | 16.166 | 16.336 | 16.506 | 16.358 | 15.744 | 16.054 | 16.387 | 16.191 |
| -13 | | 16.536 | 16.544 | 16.537 | 16.417 | 16.527 | 16.538 | 16.535 | 16.414 | 16.406 | 16.461 | 16.504 | 16.373 | 16.141 | 16.290 | 16.435 | 16.279 | 15.772 | 16.045 | 16.332 | 16.143 |
| -14 | | 16.428 | 16.436 | 16.428 | 16.282 | 16.421 | 16.432 | 16.426 | 16.279 | 16.316 | 16.365 | 16.399 | 16.245 | 16.085 | 16.216 | 16.339 | 16.169 | 15.760 | 16.002 | 16.250 | 16.057 |
| -15 | | 16.296 | 16.305 | 16.294 | 16.116 | 16.289 | 16.301 | 16.292 | 16.114 | 16.198 | 16.243 | 16.269 | 16.087 | 15.995 | 16.113 | 16.217 | 16.025 | 15.709 | 15.925 | 16.139 | 15.933 |
| -16 | | 16.134 | 16.145 | 16.131 | 15.916 | 16.129 | 16.142 | 16.130 | 15.915 | 16.048 | 16.091 | 16.109 | 15.892 | 15.870 | 15.976 | 16.063 | 15.842 | 15.616 | 15.810 | 15.995 | 15.767 |
| -17 | | 15.939 | 15.952 | 15.934 | 15.677 | 15.934 | 15.949 | 15.933 | 15.676 | 15.863 | 15.904 | 15.915 | 15.658 | 15.706 | 15.803 | 15.874 | 15.616 | 15.480 | 15.655 | 15.814 | 15.555 |
| -18 | | 15.705 | 15.720 | 15.698 | 15.394 | 15.701 | 15.717 | 15.697 | 15.393 | 15.638 | 15.677 | 15.681 | 15.378 | 15.499 | 15.588 | 15.646 | 15.344 | 15.297 | 15.457 | 15.592 | 15.293 |

| Psig/ch | Nch | 1 | | | | 2 | | | | 16 | | | | 48 | | | | 96 | | | |
|---|---|---|---|---|---|---|---|---|---|---|---|---|---|---|---|---|---|---|---|---|---|
| | PLO | 7 | 9 | 13 | 15 | 7 | 9 | 13 | 15 | 7 | 9 | 13 | 15 | 7 | 9 | 13 | 15 | 7 | 9 | 13 | 15 |
| 2 | | 16.886 | 16.919 | 16.952 | 16.927 | 16.717 | 16.811 | 16.909 | 16.843 | 14.862 | 15.528 | 16.340 | 15.804 | 12.323 | 13.529 | 15.266 | 14.063 | 10.111 | 11.617 | 14.032 | 12.346 |
| 1 | | 16.899 | 16.926 | 16.953 | 16.931 | 16.764 | 16.839 | 16.918 | 16.863 | 15.209 | 15.779 | 16.457 | 16.014 | 12.935 | 14.033 | 15.556 | 14.533 | 10.863 | 12.282 | 14.481 | 12.969 |
| 0 | | 16.903 | 16.930 | 16.951 | 16.932 | 16.799 | 16.860 | 16.923 | 16.878 | 15.504 | 15.988 | 16.550 | 16.186 | 13.491 | 14.478 | 15.800 | 14.926 | 11.570 | 12.893 | 14.874 | 13.534 |
| -1 | | 16.913 | 16.931 | 16.948 | 16.929 | 16.825 | 16.875 | 16.926 | 16.886 | 15.752 | 16.160 | 16.623 | 16.325 | 13.988 | 14.866 | 16.002 | 15.263 | 12.226 | 13.447 | 15.211 | 14.040 |
| -2 | | 16.914 | 16.929 | 16.943 | 16.924 | 16.844 | 16.884 | 16.925 | 16.890 | 15.957 | 16.299 | 16.680 | 16.436 | 14.427 | 15.199 | 16.167 | 15.549 | 12.828 | 13.942 | 15.497 | 14.487 |
| -3 | | 16.912 | 16.924 | 16.935 | 16.915 | 16.855 | 16.888 | 16.920 | 16.888 | 16.124 | 16.409 | 16.722 | 16.522 | 14.808 | 15.480 | 16.300 | 15.787 | 13.372 | 14.378 | 15.735 | 14.874 |
| -4 | | 16.905 | 16.915 | 16.924 | 16.902 | 16.859 | 16.886 | 16.912 | 16.881 | 16.258 | 16.495 | 16.751 | 16.586 | 15.134 | 15.714 | 16.404 | 15.980 | 13.856 | 14.757 | 15.931 | 15.205 |
| -5 | | 16.895 | 16.903 | 16.910 | 16.885 | 16.857 | 16.879 | 16.900 | 16.868 | 16.362 | 16.559 | 16.769 | 16.631 | 15.407 | 15.905 | 16.484 | 16.135 | 14.280 | 15.079 | 16.088 | 15.482 |
| -6 | | 16.879 | 16.887 | 16.892 | 16.862 | 16.849 | 16.867 | 16.884 | 16.849 | 16.441 | 16.605 | 16.777 | 16.659 | 15.632 | 16.058 | 16.542 | 16.253 | 14.645 | 15.348 | 16.212 | 15.709 |
| -7 | | 16.858 | 16.865 | 16.868 | 16.833 | 16.833 | 16.849 | 16.862 | 16.822 | 16.496 | 16.633 | 16.774 | 16.670 | 15.812 | 16.175 | 16.580 | 16.340 | 14.953 | 15.568 | 16.304 | 15.888 |
| -8 | | 16.831 | 16.837 | 16.839 | 16.796 | 16.810 | 16.824 | 16.834 | 16.787 | 16.530 | 16.645 | 16.761 | 16.665 | 15.952 | 16.261 | 16.600 | 16.398 | 15.207 | 15.743 | 16.369 | 16.025 |
| -9 | | 16.795 | 16.802 | 16.802 | 16.750 | 16.778 | 16.791 | 16.798 | 16.743 | 16.545 | 16.642 | 16.737 | 16.644 | 16.055 | 16.319 | 16.603 | 16.427 | 15.409 | 15.876 | 16.409 | 16.121 |
| -10 | | 16.751 | 16.757 | 16.756 | 16.691 | 16.736 | 16.748 | 16.752 | 16.686 | 16.540 | 16.623 | 16.702 | 16.606 | 16.123 | 16.350 | 16.589 | 16.431 | 15.564 | 15.971 | 16.425 | 16.180 |
| -11 | | 16.694 | 16.700 | 16.698 | 16.619 | 16.682 | 16.693 | 16.695 | 16.614 | 16.517 | 16.587 | 16.652 | 16.550 | 16.160 | 16.355 | 16.557 | 16.408 | 15.675 | 16.029 | 16.418 | 16.203 |
| -12 | | 16.624 | 16.630 | 16.626 | 16.528 | 16.613 | 16.624 | 16.623 | 16.525 | 16.472 | 16.534 | 16.587 | 16.473 | 16.166 | 16.336 | 16.506 | 16.358 | 15.744 | 16.054 | 16.387 | 16.191 |
| -13 | | 16.536 | 16.544 | 16.537 | 16.417 | 16.527 | 16.538 | 16.535 | 16.414 | 16.406 | 16.461 | 16.504 | 16.373 | 16.141 | 16.290 | 16.435 | 16.279 | 15.772 | 16.045 | 16.332 | 16.143 |
| -14 | | 16.428 | 16.436 | 16.428 | 16.282 | 16.421 | 16.432 | 16.426 | 16.279 | 16.316 | 16.365 | 16.399 | 16.245 | 16.085 | 16.216 | 16.339 | 16.169 | 15.760 | 16.002 | 16.250 | 16.057 |
| -15 | | 16.296 | 16.305 | 16.294 | 16.116 | 16.289 | 16.301 | 16.292 | 16.114 | 16.198 | 16.243 | 16.269 | 16.087 | 15.995 | 16.113 | 16.217 | 16.025 | 15.709 | 15.925 | 16.139 | 15.933 |
| -16 | | 16.134 | 16.145 | 16.131 | 15.916 | 16.129 | 16.142 | 16.130 | 15.915 | 16.048 | 16.091 | 16.109 | 15.892 | 15.870 | 15.976 | 16.063 | 15.842 | 15.616 | 15.810 | 15.995 | 15.767 |
| -17 | | 15.939 | 15.952 | 15.934 | 15.677 | 15.934 | 15.949 | 15.933 | 15.676 | 15.863 | 15.904 | 15.915 | 15.658 | 15.706 | 15.803 | 15.874 | 15.616 | 15.480 | 15.655 | 15.814 | 15.555 |
| -18 | | 15.705 | 15.720 | 15.698 | 15.394 | 15.701 | 15.717 | 15.697 | 15.393 | 15.638 | 15.677 | 15.681 | 15.378 | 15.499 | 15.588 | 15.646 | 15.344 | 15.297 | 15.457 | 15.592 | 15.293 |

Fig.9

OPTICAL RECEIVER AND OPTICAL RECEPTION METHOD

TECHNICAL FIELD

This application is based upon and claims the benefit of the priority of International Patent Application No. PCT/JP2018/041286, entitled, "OPTICAL RECEIVER AND OPTICAL RECEPTION METHOD," filed on Nov. 7, 2018, which claims the benefit of the priority of Japanese Patent Application No. 2017-217027, filed on Nov. 10, 2017. These applications are incorporated herein by reference. The embodiments of this invention relate to an optical receiver and an optical reception method, and particularly relates to an optical receiver and an optical reception method that can calculate the number of wavelengths of a wavelength multiplexed signal and power of signal light.

BACKGROUND ART

In a long-distance optical transmission system of an ultra-high speed equal to or higher than 100 gigabits per second (Gb/s), a digital coherent transmission method adopting phase modulation in place of a general transmission method using intensity modulation is considered to be promising. Among phase modulation methods, particularly, modulation-demodulation methods of which examples include not only binary phase modulation and quadrature phase modulation but also polarization-multiplexing quadrature phase modulation being excellent in optical frequency-use efficiency are under research and development because of balance of a transmission characteristic, implementation easiness, and cost. The binary phase modulation is also called binary phase shift keying (BPSK). The quadrature phase modulation is also called quadrature phase shift keying (QPSK). The polarization-multiplexing quadrature phase modulation is also called polarization multiplexing-quadrature phase shift keying (PM-QPSK).

In an optical receiver used in a digital coherent transmission method, it is necessary to measure parameters such as the number of wavelengths of a wavelength multiplexed signal and optical power of signal light included in the wavelength multiplexed signal, and to perform monitoring of a reception state and optimization of reception quality by using the measured parameters. The wavelength multiplexed signal is also called a wavelength division multiplexing (WDM) signal. In relation to the present invention, PTL 1 describes a technique of calculating an optical-signal-to-noise ratio (OSNR) of received signal light.

CITATION LIST

Patent Literature

[PTL 1] Japanese Unexamined Patent Application Publication No. 2014-165895

SUMMARY OF INVENTION

Technical Problem

A problem when an optical receiver receives a WDM signal is difficulty of monitoring the number of wavelengths and optical power per wavelength (optical power per carrier) of signal light when the WDM signal is input to the optical receiver. For example, in order to measure the number of wavelengths and optical power per wavelength of a received WDM signal, it is necessary to split received signal light, and to measure the number of wavelengths and optical power by connection of a measurement device having a spectral function, such as an optical spectrum analyzer. In such a configuration, there is a problem that optical power of a main signal is reduced because of being split, and further, the measurement device or a special dedicated device is necessary, thereby resulting in difficulty of improving performance, cost, and a size of the optical receiver.

Object of Invention

An object of the present invention is to provide a technique that can easily estimate the number of wavelengths of a WDM signal and optical power of signal light.

Solution to Problem

An optical receiver according to the present invention includes:

an optical reception means for receiving wavelength multiplexed light including signal light, converting the signal light into an electrical signal by coherent detection of the signal light performed by using local oscillation light, and outputting power of the local oscillation light, a bit error rate of the electrical signal, and the electrical signal; and a control means for monitoring the power of the local oscillation light and the bit error rate, calculating a signal-to-noise ratio of the signal light, based on the power of the local oscillation light and the bit error rate, and acquiring the number of wavelengths of the wavelength multiplexed light and power per wavelength of the signal light, based on the signal-to-noise ratio and the power of the local oscillation light.

An optical reception method according to the present invention includes:

receiving wavelength multiplexed light including signal light;

converting the signal light into an electrical signal by coherent detection of the signal light performed by using local oscillation light;

outputting power of the local oscillation light, a bit error rate of the signal light, and the electrical signal;

monitoring the power of the local oscillation light and the bit error rate;

calculating a signal-to-noise ratio of the signal light, based on the power of the local oscillation light and the bit error rate; and acquiring the number of wavelengths of the wavelength multiplexed light and power per wavelength of the signal light, based on the signal-to-noise ratio and the power of the local oscillation light.

Advantageous Effects of Invention

The optical receiver and the optical reception method according to the present invention can easily estimate the number of wavelengths of a WDM signal and signal light power.

BRIEF DESCRIPTION OF DRAWINGS

FIG. 5 is one example of calculation results (LUT) of an SNR.

FIG. 8 is one example of calculation results (LUT) of an SNR.

EXAMPLE EMBODIMENT

Hereinafter, example embodiments of the present invention are described. Each arrow in the block diagrams illustrating the example embodiments exemplifies a direction of a signal for illustration, but does not limit the direction of the signal. The same reference signs are attached to aforementioned constituent elements, and the overlapping description is omitted.

First Example Embodiment

Figure 1:
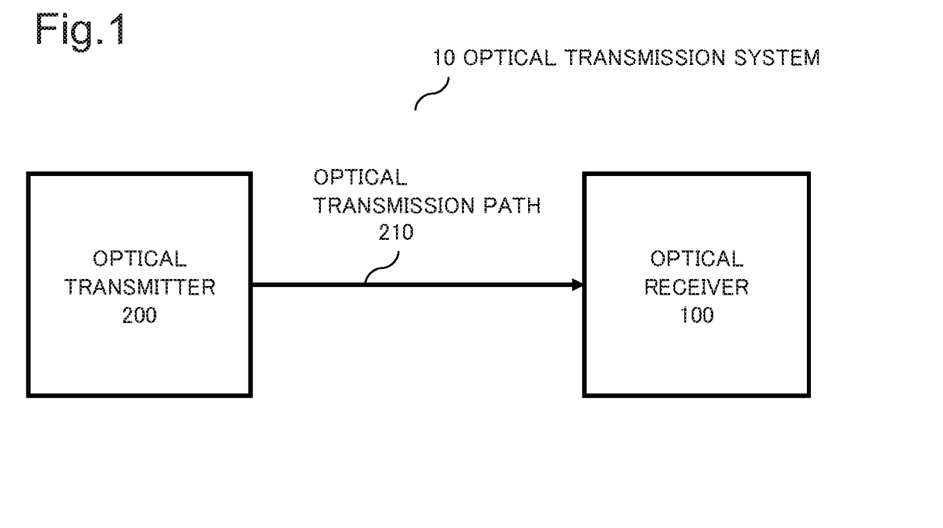
FIG. 1 is a block diagram illustrating a configuration example of an optical transmission system 10 according to a first example embodiment.

FIG. 1 is a block diagram illustrating a configuration example of an optical transmission system 10 according to a first example embodiment of the present invention. The optical transmission system 10 includes an optical receiver 100, an optical transmitter 200, and an optical transmission path 210. The optical transmitter 200 performs multi-level phase modulation on a carrier by transmission data, generates a WDM signal resulting from wavelength multiplexing performed on signal light that has been subjected to the multi-level phase modulation, and transmits the WDM signal to the optical transmission path 210. The WDM signal propagated through the optical transmission path 210 is received by the optical receiver 100. The optical receiver 100 selects, from carriers included in the WDM signal, signal light having a wavelength that is a reception target, and demodulates the selected signal light. The optical receiver 100 according to the present example embodiment includes a digital coherent detection function for demodulating signal light on which the multi-level phase modulation has been performed by the optical transmitter 200.

Figure 2:
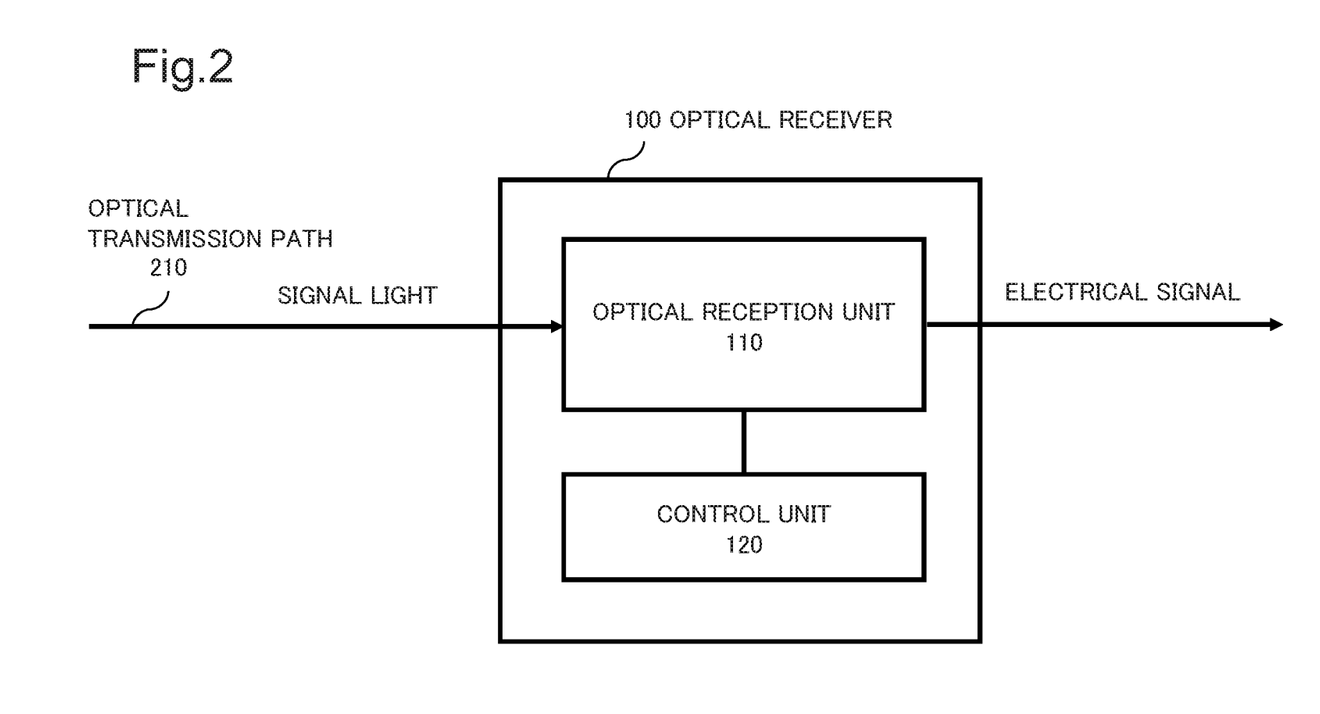
FIG. 2 is a block diagram illustrating a configuration example of an optical receiver 100 according to the first example embodiment.

FIG. 2 is a block diagram illustrating a configuration example of the optical receiver 100 according to the first example embodiment. The optical receiver 100 includes an optical reception unit 110 and a control unit 120. The optical receiver 100 receives a WDM signal from the optical transmission path 210, and performs coherent detection of the WDM signal by using local oscillation (LO) light. Thereby, signal light selected from the WDM signal is detected, and is output as an electrical signal. The light reception unit 110 outputs power of the LO light and a bit error rate of the electrical signal to the control unit 120. The electrical signal is output to an outside of the optical receiver 100. The optical reception unit 110 serves as an optical reception means including the above-described function.

The control unit 120 monitors the power of the LO light and the bit error rate of the electrical signal output from the optical reception unit 110, and calculates a signal-to-noise ratio (SNR) of the signal light, based on the power of the LO light and the bit error rate. An SNR is a ratio of signal electric power of signal light to noise electric power. Based on the SNR and the power of the LO light, the control unit 120 estimates the number of wavelengths of the signal light included in the WDM signal and power per wavelength of the signal light. The control unit 120 serves as a control means including the above-described function.

The optical receiver 100 acquires the number of wavelengths included in signal light and power per wavelength of the signal light, based on an SNR and power of LO light. As a result, the optical receiver 100 according to the first example embodiment achieves an advantageous effect that the number of wavelengths of a WDM signal and signal light power can be easily estimated.

Second Example Embodiment

Figure 3:
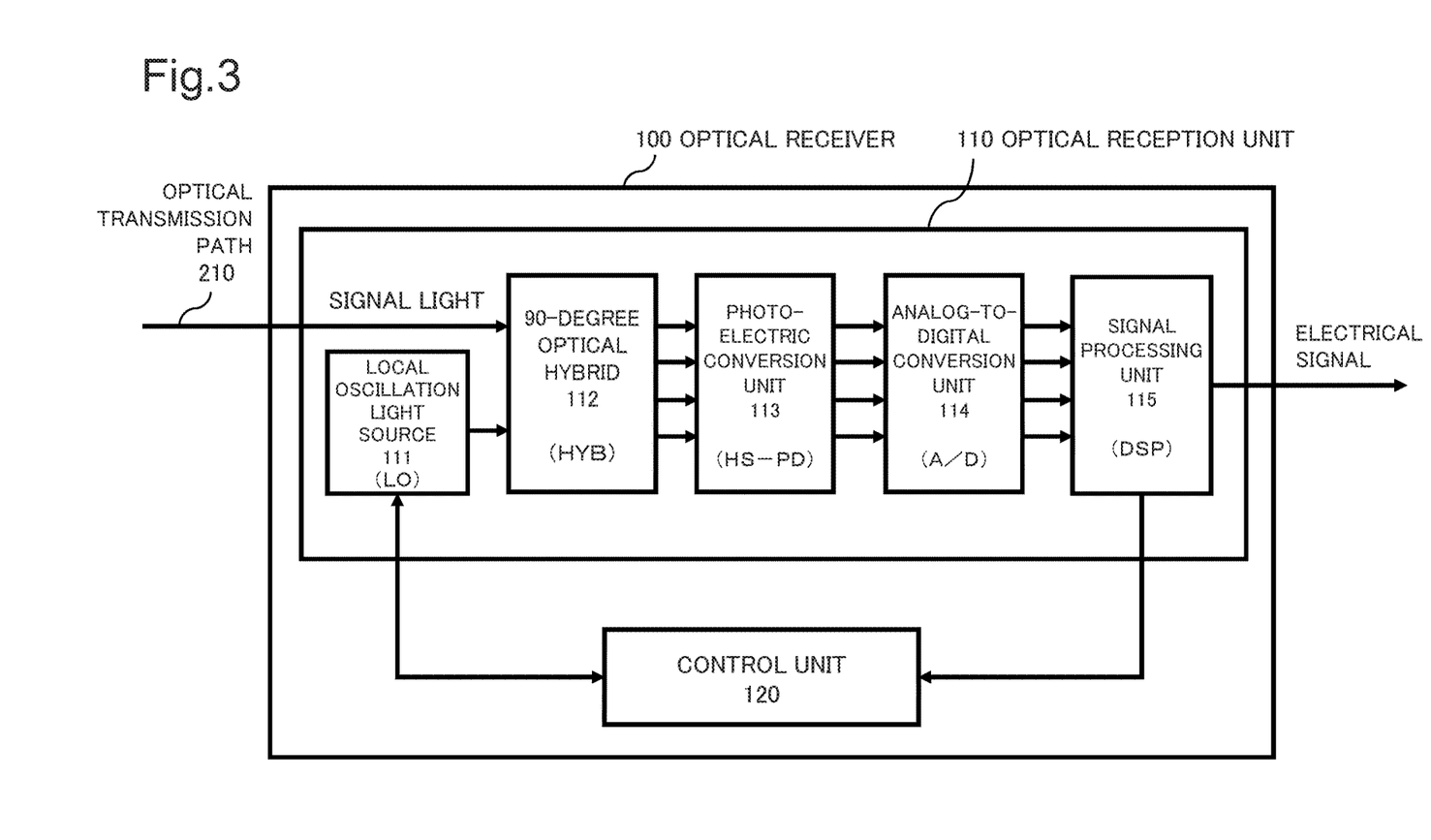
FIG. 3 is a block diagram illustrating a configuration example of an optical receiver 100 according to a second example embodiment.

FIG. 3 is a block diagram illustrating a configuration example of an optical receiver 100 according to a second example embodiment of the present invention. In the second example embodiment, description is made on more detailed examples of a configuration and operation of the optical receiver 100 described in the first example embodiment.

The optical receiver 100 according to the second example embodiment includes a local oscillation light source (LO) 111, a 90-degree optical hybrid (HYB) 112, a photoelectric conversion unit (HS-PD) 113, an analog-to-digital conversion unit (A/D) 114, and a signal processing unit (DSP) 115. The optical reception unit 110 includes these. Since a general configuration of a digital coherent receiver is known, the detailed description is omitted.

The optical receiver 100 receives a WDM signal from the optical transmission path 210. By the 90-degree optical hybrid (HYB) 112, the WDM signal is separated into in-phase signal light and quadrature phase signal light. Each of the separated pieces of the signal light interferes with LO light output by the local oscillation light source 111, and is then converted into a detection signal by the photoelectric conversion unit 113. The photoelectric conversion unit includes a light reception element such as a high-speed photodiode (HS-PD). LO light power $P_{LO}$ (LO light power) is notified from the local oscillation light source 111 to the control unit 120. The detection signal output from the photoelectric conversion unit 113 is sampled and converted into a digital signal by the analog-to-digital conversion unit 114 (analog-to-digital converter, A/D) 114.

The signal processing unit (digital signal processor, DSP) 115 performs digital coherent demodulation processing on the digital signal output from the analog-to-digital conversion unit 114, and thereby generates an electrical signal. The electrical signal is a signal including transmission data. The signal processing unit 115 notifies the control unit 120 of a bit error rate (BER) of the electrical signal acquired based on the number of error corrections.

The control unit 120 acquires an SNR of the signal light, the number of wavelengths of the received WDM signal, and power per wavelength, based on the LO light power $P_{LO}$ notified from the local oscillation light source 111 and the BER notified from the signal processing unit 115. In addition, the control unit 120 controls LO light power $P_{LO}$, based on the acquired number of wavelengths and the acquired power per wavelength.

Figure 4:
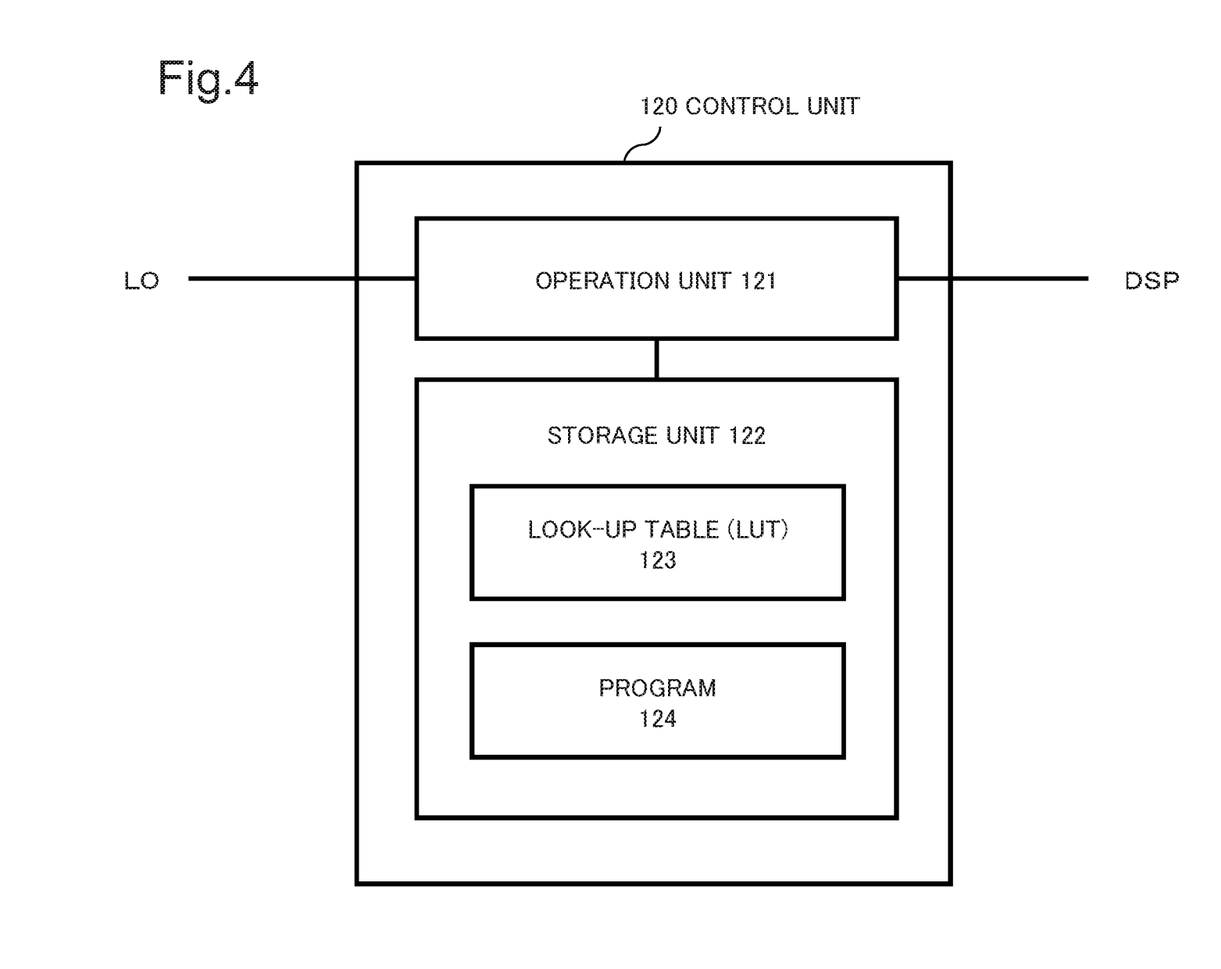
FIG. 4 is a block diagram illustrating a configuration example of a control unit 120.

FIG. 4 is a block diagram illustrating a configuration example of the control unit 120. The control unit 120 includes an operation unit 121 and a storage unit 122. The storage unit 122 stores a look-up table (LUT) 123 and a program 124. The storage unit 122 is a tangible and non-transitory storage medium. As the storage unit 122, a semiconductor memory or a fixed magnetic disk device is used, but the storage unit 122 is not limited to these. As the operation unit 121, a central processing unit (CPU) can be used. The operation unit 121 reads the program 124 from the storage unit 122 and executes the read program 124, thereby implementing the function of the control unit 120. The operation unit 121 is connected to the local oscillation light source 111 and the signal processing unit 115. The look-up table 123 is described below by using FIG. 5.

Next, a procedure of calculating an SNR in the optical receiver 100 is described. First, an SNR of signal light included in WDM light input to the optical receiver 100 is calculated. In the present example embodiment, an SNR of the signal light is calculated by an electric circuit of the optical receiver 100.

It is assumed that power of each piece of signal light input to the optical receiver 100 is $P_{sig}$ [W], LO light power is $P_{LO}$ [W], and light reception sensitivity of a light reception element of the photoelectric conversion unit 113 is R [A/W]. In this case, electric power [dBm] of a PD current $I_{sig}$ flowing at the time of coherent detection of signal light performed by LO light is represented by equation (1). In the following equations (1) to (7), electric power represented with [dBm] indicates electric power in a reception band of the optical receiver 100.

$$\langle I_{sig}^2 \rangle = \tfrac{1}{2} R^2 P_{sig} P_{LO} \quad (1)$$

Assuming that power of amplified spontaneous emission (ASE) noise light input to the optical receiver 100 is $P_{ase}$ [W], electric power [dBm] of beat noise current $I_{ase-LO}$ of the ASE noise light and LO light is represented by equation (2).

$$\langle I_{ase-LO}^2 \rangle = \tfrac{1}{2} R^2 P_{ase} P_{LO} \quad (2)$$

Electric power [dBm] of beat noise current $I_{ase-ase}$ of pieces of the ASE noise light is represented by equation (3).

$$\langle I_{ase-ase}^2 \rangle = \tfrac{1}{4} R^2 P_{ase}^2 \quad (3)$$

Electric power [dBm] of beat noise current $I_{sig-sig}$ of pieces of the signal light input to the optical receiver 100 and having the number $N_{ch}$ of wavelengths is represented by equation (4).

$$\langle I_{sig-sig}^2 \rangle = \tfrac{1}{4} R^2 N^{ch} P_{sig}^2 \quad (4)$$

Next, a term concerning shot noise of the optical receiver 100 is acquired. The shot noise is temporal fluctuation of noise that appears in a signal. Assuming that an electron charge is q [C], electric power [dBm] of shot noise current $I_{shot}$ flowing in the light reception element of the photoelectric conversion unit 113 is represented by equation (5).

$$\langle I_{shot}^2 \rangle = 2qR(N_{ch}P_{sig}+P_{ase}+P_{LO}) \quad (5)$$

Assuming that the Boltzmann constant is k, a temperature of an amplifier is T [K], and a load of a circuit is $R_L$ [Ω], a thermal noise current $I_{thermal}$ [dBm] of the circuit of the optical receiver 100 is represented by equation (6).

$$\langle I_{thermal}^2 \rangle = \frac{4kT}{R_L} \quad (6)$$

Since an SNR of the signal light input to the optical receiver 100 is a ratio between power of the input signal light and noise power, equation (7) is acquired from equation (1) to equation (6).

$$SNR = \frac{\langle I_{sig}^2 \rangle}{\langle I_{ase-LO}^2 \rangle + \langle I_{ase-ase}^2 \rangle + \langle I_{sig-sig}^2 \rangle + \langle I_{shot}^2 \rangle + \langle I_{thermal}^2 \rangle} \quad (7)$$

$$= \frac{\tfrac{1}{2} R^2 P_{sig} P_{LO}}{\tfrac{1}{2} R^2 P_{ase} P_{LO} + \tfrac{1}{4} R^2 P_{ase}^2 + \tfrac{1}{4} R^2 N_{ch} P_{sig}^2 + 2qR(N_{ch}P_{sig} + P_{ase} + P_{LO}) + \frac{4kT}{R_L}}$$

A relation between a reception Q value and an SNR in a quadrature phase modulation signal is represented by equation (8).

$$SNR = Q^2 \quad (8)$$

A general relation equation between a BER and a Q value in which a complementary error function erfc is used is represented by equation (9).

$$Q = \sqrt{2} \times erfc^{-1}(2 \times BER) \quad (9)$$

Inputting an actual value to equation (7) can acquire a relation between input power $P_{sig}$ of signal light per wavelength to the optical receiver 100 and a reception SNR. Using equation (8) can make conversion between an SNR and a Q value.

Figure 6:
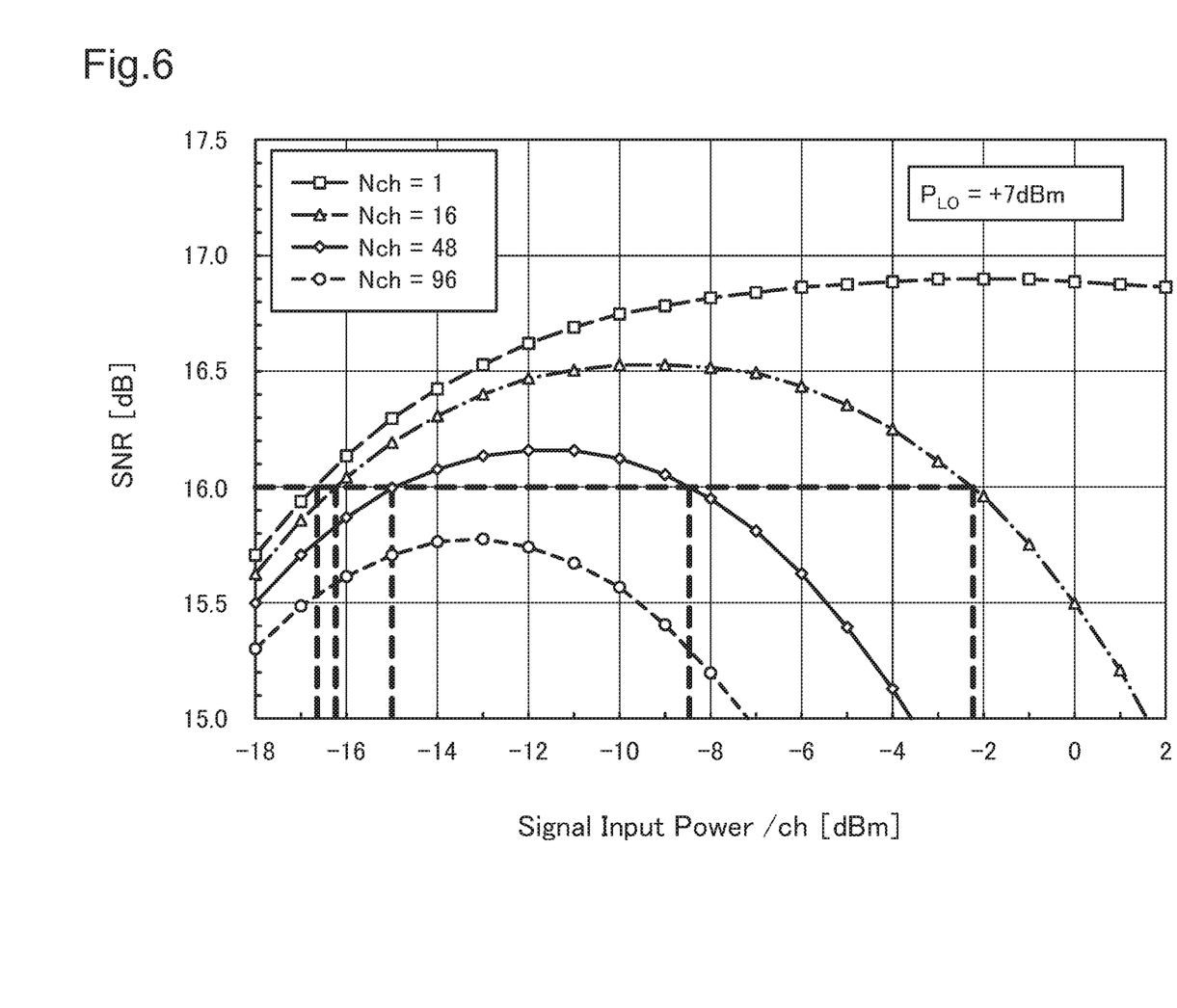
FIG. 6 is a graph of an example of calculation results of an SNR when $P_{LO}$ is +7 dBm.

FIG. 5 is a look-up table representing one example of calculation results of an SNR under a condition that LO light power $P_{LO}$ is +7, +9, +13, and +15 dBm in the cases where the number $N_{ch}$ of wavelengths of signal light is 1, 2, 16, 48, and 96. FIG. 5 is the result of calculating an SNR while changing LO light power, the number of wavelengths, and input power of signal light per wavelength. A table such as FIG. 5 is stored in the storage unit 122 as the look-up table (LUT) 123. FIG. 6 is a graph representing the example of the calculation results of an SNR in the cases where the number $N_{ch}$ of wavelengths is 1, 16, 48, and 96 when LO light power $P_{LO}$ is +7 dBm. The graph of FIG. 6 can be drawn based on the look-up table. The horizontal axis in FIG. 6 represents input power $P_{sig}$ (signal input power/ch) of the signal light per wavelength, and the vertical axis represents an SNR.

When signal light is actually input to the optical receiver 100, SNRs at different values of LO light power are calculated, and from the calculation results, the number of wavelengths and input power $P_{sig}$ of the signal light per wavelength can be estimated. This estimation can be performed even when the number $N_{ch}$ of wavelengths and input power $P_{sig}$ of the signal light per wavelength is unknown. An actual SNR can be calculated by using equations (8) and (9) from a value of a BER output by the signal processing unit 115 and LO light power $P_{LO}$ output by the local oscillation light source 111.

First, when a value of an SNR in the vertical axis in FIG. 6 is fixed to a calculated value based on received signal light, combinations of the number $N_{ch}$ of wavelengths and input power $P_{sig}$ of the signal light per wavelength are limited to several intersection points on the graph. The following describes the case where a calculated SNR is 16.0 dB. FIG. 6 illustrates that the horizontal axis of SNR=16.0 dB intersects with the graph at five points.

Figure 7:
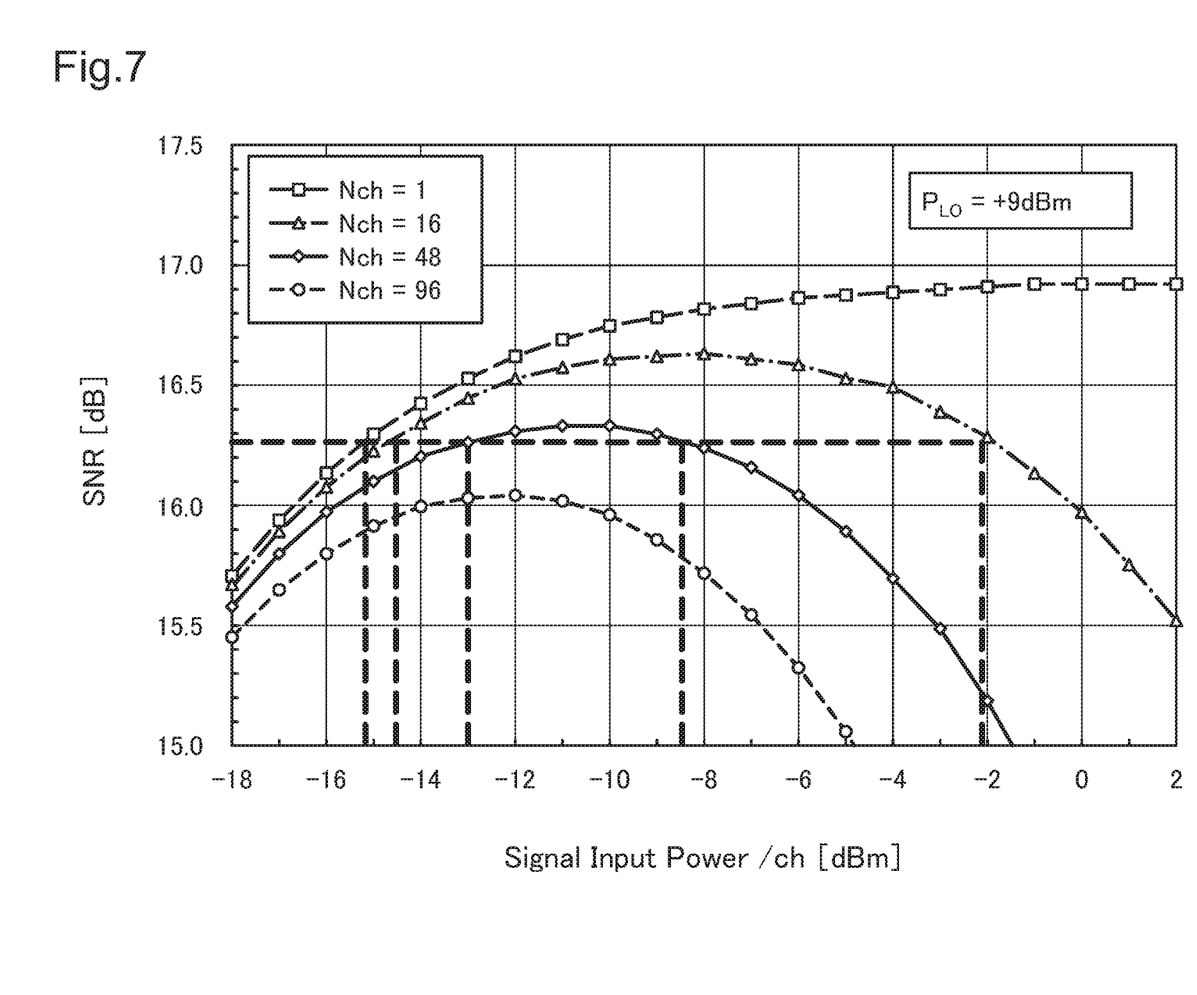
FIG. 7 is a graph of an example of calculation results of an SNR when $P_{LO}$ is +9 dBm.

FIG. 7 is a graph of an example of calculation results of an SNR when LO light power $P_{LO}$ is +9 dBm. It is assumed that when LO light power $P_{LO}$ is increased to +9 dBm, the calculation result of an SNR becomes 16.3 dB. Also in FIG. 7, the horizontal axis of SNR=16.3 dB intersects with the graph at five points. However, the number $N_{ch}$ of wavelengths input to the optical receiver 100 and input power $P_{sig}$ ("signal input power/ch") of signal light are the same as those in the case of FIG. 6. Accordingly, it can be estimated that in FIGS. 6 and 7, a condition that input power $P_{sig}$ and the number $N_{ch}$ of wavelengths of signal light at the intersection point between the SNR and the graph is the same in each of the figures indicates a current state of the signal light of the optical receiver 100. In the present example embodiment, from FIGS. 6 and 7, it can be estimated that the case where the combination of the number $N_{ch}$ of wavelengths and input power of signal light is $N_{ch}$=48 and $P_{sig}$=−8.5 dBm/ch is a condition of the currently input signal light. When two or more combinations of the number $N_{ch}$ of wavelengths and input power $P_{sig}$ of the signal light remain at this time, by the LO light power $P_{LO}$ further changed to a different value, the combinations of the number $N_{ch}$ of wavelengths and input power $P_{sig}$ of the signal light may be narrowed.

In FIGS. 6 and 7, the estimated input power $P_{sig}$ and the estimated number $N_{ch}$ of wavelengths of signal light do not need to be exactly the same as values on the graph. For example, input power $P_{sig}$ and the number $N_{ch}$ of wavelengths of the signal light associated with a point in an area ranging from a position of a point on the graph within a distance equal to or smaller than a predetermined value may be used as estimated values. In other words, in the cases of two or more cases between which LO light power $P_{LO}$ is different, an estimated result may be input power $P_{sig}$ and the number $N_{ch}$ of wavelengths of the signal light both of which are substantially the same between the cases.

Next, optimization of LO light power $P_{LO}$ is described. In a general digital coherent receiver, it has been difficult to optimally control LO light power $P_{LO}$ which is an important parameter affecting a reception characteristic. For example, when the number of received wavelengths changes from one wavelength to several tens of wavelengths, it has been difficult to monitor the number $N_{ch}$ of wavelengths of a WDM signal and input power $P_{sig}$ of the signal light per wavelength, and thus, it has been also difficult to optimally control LO light power.

Figure 9:
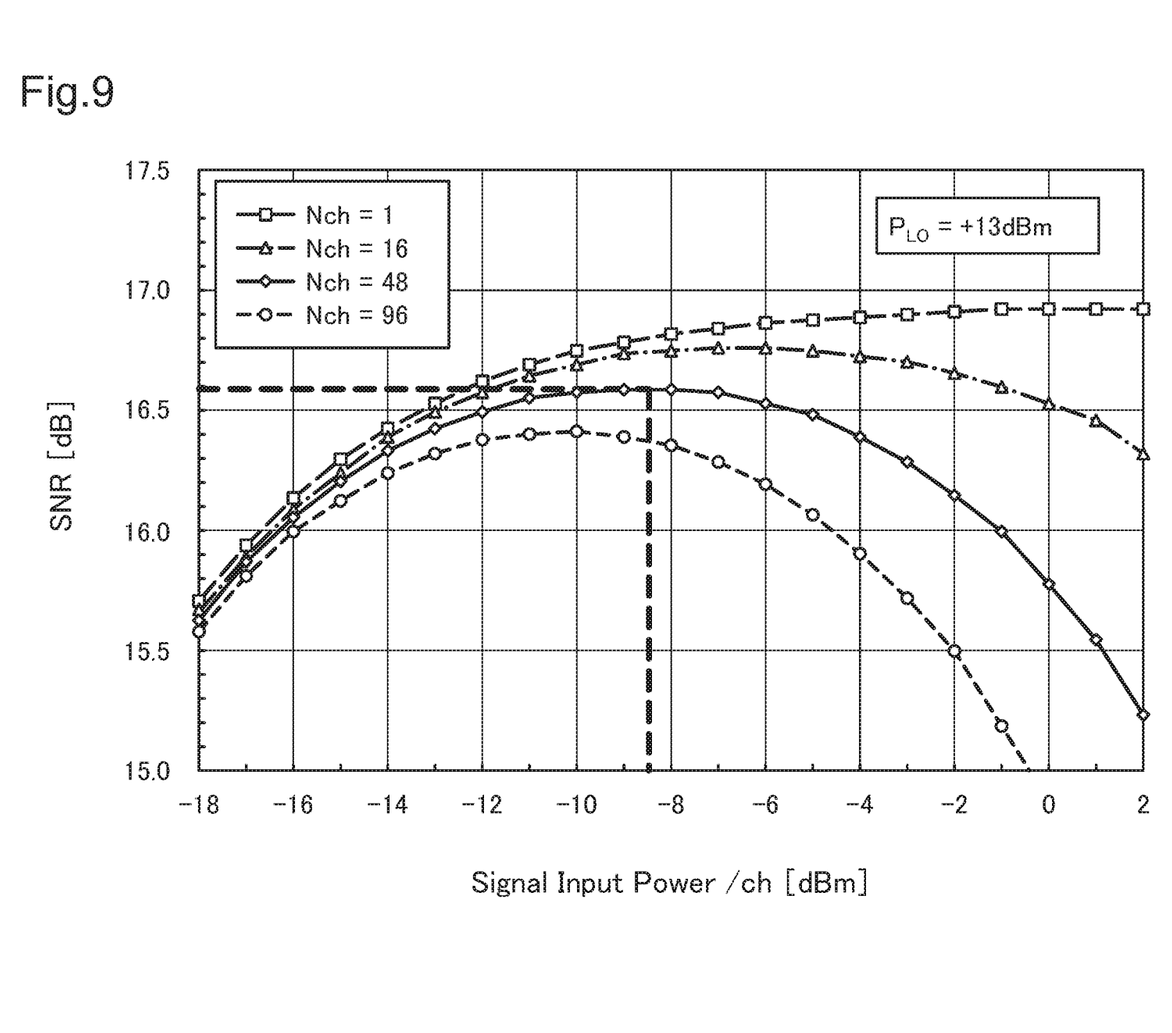
FIG. 9 is a graph representing an SNR when $P_{LO}$ is +13 dBm.

According to a procedure of the present example embodiment, an estimated number $N_{ch}$ of wavelengths and estimated input power $P_{sig}$ of signal light are fixed, and LO light power $P_{LO}$ resulting in the optimum SNR can be acquired by using the look-up table. FIG. 8 is a look-up table that is the same as FIG. 5 and that represents calculation results of an SNR. FIG. 9 is a graph representing calculation results of an SNR when $P_{LO}$ is +13 dBm. FIG. 8 reveals that in the case of "$N_{ch}$=48 as the above-estimated number of wavelengths and $P_{sig}$=−8.5 dBm as the above-estimated input power of signal light", LO light power $P_{LO}$ that optimizes an SNR is approximately +13 dBm (in the bold frame in FIG. 8). Accordingly, the control unit 120 controls the local oscillation light source 111 in such a way that $P_{LO}$ becomes +13 dBm, and thereby increases an SNR of signal light to approximately 16.6 dB (FIGS. 8 and 9), enabling improvement in a reception characteristic.

Figure 10:
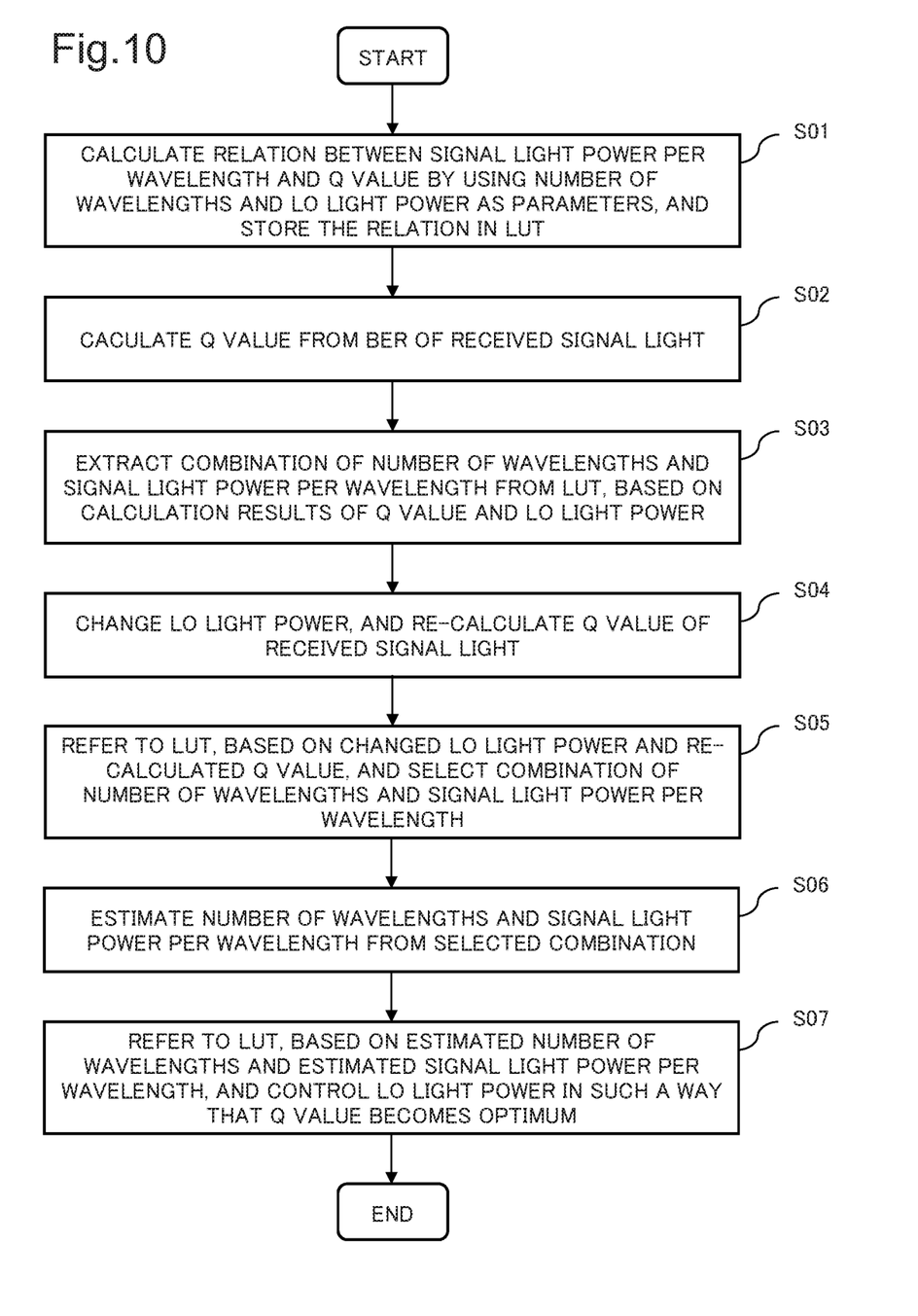
FIG. 10 is a flowchart illustrating an example of an operation procedure of a control unit 120.

FIG. 10 is a flowchart illustrating an example of an operation procedure of the control unit 120 in the second example embodiment. In the description using the look-up table, an SNR has been described as one of parameters. As represented in equation (8), conversion between an SNR and a Q value can be easily made. Accordingly, as illustrated in FIG. 10, a combination of the number $N_{ch}$ of wavelengths and signal light power $P_{sig}$ can be estimated by using a Q value instead of an SNR, and LO light power $P_{LO}$ can be optimized.

First, a relation between signal light power per wavelength and a Q value (or an SNR) is calculated by using the number of wavelengths and LO light power as parameters, and is stored as an LUT (step S01 in FIG. 10). The LUT is stored in the storage unit 122. Next, a Q value is calculated from a BER of received signal light (step S02). In the calculation of a Q value, equation (9) can be used. Then, based on the calculation result of a Q value and LO light power, a combination of the number of wavelengths and signal light power per wavelength is extracted from the LUT (step S03). Then, LO light power is changed, and in this state, a Q value of the signal light is re-calculated (step S04). Based on the changed LO light power and the re-calculated Q value, the LUT is referred to, and the combination of the number of wavelengths and signal light power per wavelength is selected (step S05). At this time, the same combination as the combination extracted at the step S03 is selected, and from the combination, the number of wavelengths and the signal light power per wavelength are estimated (step S06).

Further, the LUT may be referred to based on the estimated number of wavelengths and the estimated signal light power per wavelength, and LO light power may be controlled in such a way that a Q value becomes optimum (step S07).

Thus, the optical receiver 100 according to the second example embodiment calculates an SNR or a Q value of input signal light, based on a BER output from the signal processing unit 115 and LO light power $P_{LO}$ output from the local oscillation light source 111. As a result, an SNR and a Q value of the signal light can be acquired by calculation without using a dedicated measurement device or a spectroscopic device, and further, the number $N_{ch}$ of wavelengths of a WDM signal and input power $P_{sig}$ of the signal light per wavelength can be estimated.

The procedure of the present example embodiment does not depend on a bit rate and a modulation method of signal light. In other words, whether a transmission speed is 40 Gbps or 100 Gbps, the above-described procedure is not affected by the transmission speed. A modulation method of signal light is not limited to quadrature phase modulation. The procedure of the present example embodiment is also applicable to a WDM signal transmitted by binary or octal phase modulation, or to a transmitted WDM signal intensity-modulated by such as a non-return-to-zero (NRZ) signal or a return-to-zero (RZ) signal. The present invention is also further applicable to a modulation method, such as m-value quadrature amplitude modulation (m-QAM), in which phase modulation and intensity modulation are combined.

The following describes advantageous effects of the present example embodiment.

The first advantageous effect is that a measurement device for monitoring an SNR, an optical splitting device causing deterioration of a characteristic of main signal light, and the like are not required. The reason is that an SNR or a Q value is acquired by calculation using a BER output from the signal processing unit provided in the digital coherent receiver and LO light power $P_{LO}$ output from the local oscillation light source 111. The reason is also that by using this result, signal light power $P_{sig}$ per wavelength input to the optical receiver 100 and the number $N_{ch}$ of wavelengths can be estimated by calculation.

In other words, by using an actually measurable BER acquired from the signal processing unit 115, the optical receiver 100 according to the present example embodiment can acquire, by calculation, signal light power $P_{sig}$ per wavelength input to the optical receiver 100 and the number $N_{ch}$ of wavelengths, which are difficult to actually measure.

The second advantageous effect is that LO light power $P_{LO}$ can be optimally controlled. The reason is that at the estimated signal light power $P_{sig}$ per wavelength and the estimated number $N_{ch}$ of wavelengths, calculation or referring to a look-up table can acquire LO light power $P_{LO}$ at which an optimum SNR can be achieved.

The whole or part of the example embodiments disclosed above can be described as, but not limited to, the following supplementary notes.

(Supplementary Note 1)

An optical receiver including:

an optical reception means for receiving wavelength multiplexed light including signal light, converting the signal light into an electrical signal by coherent detection of the signal light performed by using local oscillation light, and outputting power of the local oscillation light, a bit error rate of the electrical signal, and the electrical signal; and a control means for monitoring the power of the local oscillation light and the bit error rate, calculating a signal-to-noise ratio of the signal light, based on the power of the local oscillation light and the bit error rate, and acquiring the number of wavelengths of the wavelength multiplexed light and power per wavelength of the signal light, based on the signal-to-noise ratio and the power of the local oscillation light.

(Supplementary Note 2)

The optical receiver according to the Supplementary Note 1, wherein in two or more cases between which power of the local oscillation light is different, the control means acquires the number of wavelengths and the power per wavelength both of which are substantially the same between the cases.

(Supplementary Note 3)

The optical receiver according to the Supplementary Note 1 or 2, wherein the control means stores a look-up table in which a relation among the number of wavelengths, the power per wavelength, the signal-to-noise ratio, and the power of the local oscillation light is calculated in advance, and the control means acquires the number of wavelengths and the power per wavelength by using the look-up table.

(Supplementary Note 4)

The optical receiver according to any one of the Supplementary Notes 1 to 3, wherein the control means controls the power of the local oscillation light in such a way as to improve the calculated signal-to-noise ratio.

(Supplementary Note 5)

The optical receiver according to any one of the Supplementary Notes 1 to 4, wherein the control means uses a Q value instead of the signal-to-noise ratio.

(Supplementary Note 6)

An optical reception method including:

receiving wavelength multiplexed light including signal light;

converting the signal light into an electrical signal by coherent detection of the signal light performed by using local oscillation light;

outputting power of the local oscillation light, a bit error rate of the signal light, and the electrical signal;

monitoring the power of the local oscillation light and the bit error rate;

calculating a signal-to-noise ratio of the signal light, based on the power of the local oscillation light and the bit error rate; and acquiring the number of wavelengths of the wavelength multiplexed light and power per wavelength of the signal light, based on the signal-to-noise ratio and the power of the local oscillation light.

(Supplementary Note 7)

The optical reception method according to the Supplementary Note 6, wherein in two or more cases between which power of the local oscillation light is different, the number of wavelengths and the power per wavelength both of which are substantially the same between the cases are acquired.

(Supplementary Note 8)

The optical reception method according to the Supplementary Note 6 or 7, wherein the number of wavelengths and the power per wavelength are acquired by using a relation among the number of wavelengths, the power per wavelength, the signal-to-noise ratio, and the power of the local oscillation light.

(Supplementary Note 9)

The optical reception method according to any one of the Supplementary Notes 6 to 8, further including: controlling the power of the local oscillation light in such a way as to improve the signal-to-noise ratio.

(Supplementary Note 10)

The optical reception method according to any one of the Supplementary Notes 6 to 9, wherein a Q value is used instead of the signal-to-noise ratio.

(Supplementary Note 11)

A program of an optical receiver, the program causing a computer of the optical receiver to execute:

a procedure of receiving wavelength multiplexed light including signal light;

a procedure of converting the signal light into an electrical signal by coherent detection of the signal light performed by using local oscillation light;

a procedure of outputting power of the local oscillation light, a bit error rate of the signal light, and the electrical signal;

a procedure of monitoring the power of the local oscillation light and the bit error rate;

a procedure of calculating a signal-to-noise ratio of the signal light, based on the power of the local oscillation light and the bit error rate; and a procedure of acquiring the number of wavelengths of the wavelength multiplexed light and power per wavelength of the signal light, based on the signal-to-noise ratio and the power of the local oscillation light.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The configurations described in the example embodiments do not necessarily exclude each other. The functions and advantageous effects of the present invention may be implemented by a configuration in which all or parts of the above-described example embodiments are combined. This application is based upon and claims the benefit of priority from Japanese patent application No. 2017-217027, filed on Nov. 10, 2017, the disclosure of which is incorporated herein in its entirety by reference.

REFERENCE SIGNS LIST

10 Optical transmission system
100 Optical receiver
110 Optical reception unit
111 Local oscillation light source (LO)
112 90-degree optical hybrid (HYB)
113 Photoelectric conversion unit (HS-PD)
114 Analog-to-digital conversion unit (A/D)
115 Signal processing unit (DSP)
120 Control unit
121 Operation unit
122 Storage unit
123 Look-up table (LUT)
124 Program
200 Optical transmitter
210 Optical transmission path

The invention claimed is:

1. An optical receiver comprising:
an optical reception circuit configured to receive wavelength multiplexed light including signal light, convert the signal light into an electrical signal by coherent detection of the signal light performed by using local oscillation light, and output power of the local oscillation light, a bit error rate of the electrical signal, and the electrical signal; and
a controller configured to monitor the power of the local oscillation light and the bit error rate, calculate a signal-to-noise ratio of the signal light, based on the power of the local oscillation light and the bit error rate, and acquire a number of wavelengths of the wavelength multiplexed light and power per wavelength of the signal light, based on the signal-to-noise ratio and the power of the local oscillation light.

2. The optical receiver according to claim 1, wherein
in two or more cases between which power of the local oscillation light is different, the controller acquires the number of wavelengths and the power per wavelength both of which are substantially the same between the cases.

3. The optical receiver according to claim 1, wherein
the controller stores a look-up table in which a relation among the number of wavelengths, the power per wavelength, the signal-to-noise ratio, and the power of the local oscillation light is calculated in advance, and the controller acquires the number of wavelengths and the power per wavelength by using the look-up table.

4. The optical receiver according to claim 1, wherein
the controller controls the power of the local oscillation light in such a way as to improve the calculated signal-to-noise ratio.

5. The optical receiver according to claim 1, wherein
the controller uses a Q value instead of the signal-to-noise ratio.

6. An optical reception method comprising:
receiving wavelength multiplexed light including signal light;
converting the signal light into an electrical signal by coherent detection of the signal light performed by using local oscillation light;
outputting power of the local oscillation light, a bit error rate of the signal light, and the electrical signal;
monitoring the power of the local oscillation light and the bit error rate;
calculating a signal-to-noise ratio of the signal light, based on the power of the local oscillation light and the bit error rate; and
acquiring a number of wavelengths of the wavelength multiplexed light and power per wavelength of the signal light, based on the signal-to-noise ratio and the power of the local oscillation light.

7. The optical reception method according to claim 6, wherein
in two or more cases between which power of the local oscillation light is different, the number of wavelengths and the power per wavelength both of which are substantially the same between the cases are acquired.

8. The optical reception method according to claim 6, wherein
the number of wavelengths and the power per wavelength are acquired by using a relation among the number of wavelengths, the power per wavelength, the signal-to-noise ratio, and the power of the local oscillation light.

9. The optical reception method according to claim 6, wherein
the power of the local oscillation light is controlled in such a way as to improve the signal-to-noise ratio.

10. The optical reception method according to claim 6, wherein
a Q value is used instead of the signal-to-noise ratio.

11. A tangible and non-transitory storage medium that stores a program of an optical receiver, the program causing a computer of the optical receiver to execute:
a procedure of receiving wavelength multiplexed light including signal light;
a procedure of converting the signal light into an electrical signal by coherent detection of the signal light performed by using local oscillation light;
a procedure of outputting power of the local oscillation light, a bit error rate of the signal light, and the electrical signal;
a procedure of monitoring the power of the local oscillation light and the bit error rate;
a procedure of calculating a signal-to-noise ratio of the signal light, based on the power of the local oscillation light and the bit error rate; and
a procedure of acquiring a number of wavelengths of the wavelength multiplexed light and power per wavelength of the signal light, based on the signal-to-noise ratio and the power of the local oscillation light.

12. The optical receiver according to claim 2, wherein
the controller stores a look-up table in which a relation among the number of wavelengths, the power per wavelength, the signal-to-noise ratio, and the power of the local oscillation light is calculated in advance, and the controller acquires the number of wavelengths and the power per wavelength by using the look-up table.

13. The optical receiver according to claim 2, wherein
the controller controls the power of the local oscillation light in such a way as to improve the calculated signal-to-noise ratio.

14. The optical receiver according to claim 3, wherein the controller controls the power of the local oscillation light in such a way as to improve the calculated signal-to-noise ratio.

15. The optical receiver according to claim 12, wherein the controller controls the power of the local oscillation light in such a way as to improve the calculated signal-to-noise ratio.

16. The optical receiver according to claim 2, wherein the controller uses a Q value instead of the signal-to-noise ratio.

17. The optical receiver according to claim 3, wherein the controller uses a Q value instead of the signal-to-noise ratio.

18. The optical receiver according to claim 4, wherein the controller uses a Q value instead of the signal-to-noise ratio.

19. The optical receiver according to claim 12, wherein the controller uses a Q value instead of the signal-to-noise ratio.

20. The optical receiver according to claim 13, wherein the controller uses a Q value instead of the signal-to-noise ratio.

\* \* \* \* \*